United States Patent [19]

Broering et al.

[11] Patent Number: 5,014,509
[45] Date of Patent: May 14, 1991

[54] DIESEL ENGINE WHITE SMOKE CONTROL SYSTEM

[75] Inventors: Louis C. Broering, Hope; Paul R. Miller, Columbus, both of Ind.

[73] Assignee: Cummins Engine Company, Inc., Columbus, Ind.

[21] Appl. No.: 457,965

[22] Filed: Dec. 27, 1989

[51] Int. Cl.⁵ ............................................. F01N 3/02
[52] U.S. Cl. ...................................... 60/274; 55/283; 60/286; 60/288
[58] Field of Search ..................... 60/274, 286, 288; 55/DIG. 30, 466, 283

[56] References Cited

U.S. PATENT DOCUMENTS

| | | |
|---|---|---|
| 3,852,042 | 12/1974 | Wagner . |
| 4,211,075 | 7/1980 | Ludecke et al. . |
| 4,319,453 | 3/1982 | Mann .................................. 60/309 |
| 4,322,387 | 3/1982 | Virk et al. . |
| 4,383,411 | 5/1983 | Riddel . |
| 4,416,674 | 11/1983 | McMahon et al. . |
| 4,427,418 | 1/1984 | Kogiso et al. . |
| 4,544,388 | 10/1985 | Rao et al. . |
| 4,655,037 | 4/1987 | Rao ..................................... 60/274 |
| 4,665,690 | 5/1987 | Nomoto ............................. 60/288 |

Primary Examiner—Douglas Hart
Attorney, Agent, or Firm—Sixbey, Friedman, Leedom & Ferguson

[57] ABSTRACT

A system for reducing the emission of condensed unburned fuel from diesel engines is disclosed. The system includes an exhaust gas flow passage having a particulate filter positioned therein for trapping particulate matter entrained within the exhaust gas and a burner for selectively elevating the exhaust gas temperature. Sensors are provided for continuously monitoring the ambient air temperature and the exhaust gas temperature and relaying values indicative of these temperatures to a control module. The control module in turn compares these determined values to predetermined minimal values. If both the ambient air temperature and the exhaust gas temperature are less than the predetermined minimal values, the control module will activate the burner in order to raise the exiting exhaust gas temperature to reduce the emission of condensed unburned fuel.

12 Claims, 3 Drawing Sheets

DIESEL ENGINE WHITE SMOKE CONTROL SYSTEM

TECHNICAL FIELD

The present invention relates to a system for controlling white smoke emissions from diesel engines during cold starts and prolonged idle in cold weather operation. More particularly, the present invention relates to a system for heating diesel engine exhaust during cold starts and prolonged idle in cold weather operation to eliminate white smoke emissions.

BACKGROUND OF THE INVENTION

A constant complaint of loading dock workers, mechanics and general bystanders is the odor and smoke which is emitted from diesel engines during cold start up and prolonged idle in cold weather at places such as truck stops, freight terminals and loading docks. The exhaust gas which is emitted under these conditions is known as white smoke because of its light gray to white color. White smoke consists of unburned fuel in the form of small droplets which condense as they reach their saturation temperature. This condition will persist until the engine is run under load and warmed up.

In addition to the odor associated with white smoke, by allowing unburned fuel and consequently unburned hydrocarbons to be emitted into the atmosphere, engines operating in many areas will not be able to meet the rigorous National Air Quality Standards for Hydrocarbons and ozone levels which are to be fully implemented by 1994. Consequently, it can be seen that there is a pressing need for an inexpensive and reliable system for eliminating white smoke emissions from diesel engines during cold starts and prolonged idle in cold weather.

In an attempt to reduce white smoke emissions from diesel engines it has been proposed to significantly increase the temperature of the intake air into the engine's cylinders in order to more completely ignite the diesel fuel injected therein. However, this in-cylinder combustion technique requires the incorporation of a burner or other type of heater into the air intake system as well as sensors and an independent control system to monitor and operate the heater. As can be appreciated, such a system will be expensive to employ, and would require extensive modifications to the engine's air intake system. Further, while raising the air intake temperature improves in-cylinder combustion, a portion of the injected fuel remains unburned. Consequently, at low ambient air temperatures, this unburned fuel will condense resulting in white smoke when emitted from the engine.

While not related to the above mentioned problem, it has been known in the art to increase the temperature of diesel exhaust gas and particulate filters positioned within the exhaust gas stream by way diesel fuel burners or electric heating elements. Examples of such are disclosed in U.S. Pat. No. 4,383,411 issued to Riddel and U.S. Pat. No. 4,544,388 issued to Rao et al. respectively. As can be seen from the above disclosures, it is only after the engine has been operating for an extended period of time that the burner or heating elements are activated, and this activation is initiated for the purpose of regenerating the "full" ceramic particulate trap. Likewise, upon completion of the regeneration cycle, the burner or heating elements are deactivated until such time as the ceramic particulate trap once again requires regeneration. As mentioned above, it is during start up and prolonged idle at low ambient air temperatures that unburned fuel (unburned hydrocarbons) condenses and results in the undesirable white smoke. Therefore, the above mentioned systems do not aid in lessening the irritating odor and smoke associated with white smoke.

As can be seen from the foregoing, an inexpensive and reliable system for eliminating white smoke emissions from diesel engines during cold starts and prolonged idle in cold weather is needed both for reducing hydrocarbon emissions and for eliminating much of the odor associated with white smoke. Such a system would broaden the overall acceptance of diesel powered vehicles.

SUMMARY OF THE INVENTION

It is a primary object of the present invention to overcome the deficiencies associated with the above mentioned prior art by providing a system for reducing the emission of condensed unburned fuel which constitutes white smoke. Such an objective, is accomplished by modifying an existing heating assembly in order to achieve a desired exhaust gas temperature.

Another object of the present invention is to provide an economical and reliable system for reducing the emission of condensed unburned fuel which constitutes white smoke by modifying the control program of an existing integral bypass trapping system.

It is yet another object of the present to improve product perception as well as to improve the acceptability of various types of diesel powered vehicles in areas where strict environmental restrictions must be met by eliminating the odor and particulate matter associated with unburned condensed fuel present in diesel exhaust gas.

A further object of the present invention is to provide a system which will assure the proper activation of a regeneration burner during a regeneration mode of operation. By providing a control module in accordance with the present invention, if the system is determined to be in a regeneration mode, operation of the regeneration burner is confirmed and activated if such has not already occurred.

Yet another object of the present invention is to provide a method for reducing the emission of condensed unburned fuel from diesel engines including the steps of monitoring and determining the existing ambient air temperature, monitoring and determining the existing exhaust gas temperature, relaying these values to a control module, comparing these determined values to predetermined minimal values and activating a regeneration burner if the existing ambient air temperature is less than the predetermined minimal ambient air temperature and the existing exhaust gas temperature is less than the predetermined minimal exhaust gas temperature.

These as well as other advantages of the present invention are achieved by providing a system for reducing the emission of condensed unburned fuel from diesel engines including an exhaust gas flow passage for directing the flow of exhaust gas to an outlet of the system where the exhaust gas is emitted to the atmosphere and a heating device for heating the exhaust gas as it passes through the exhaust gas flow passage. Also provided is a sensing system for determining the existing ambient air temperature and exhaust gas temperature, and a control system for activating the heating device in response to the sensing system determining an ambient temperature below a predetermined value and an exhaust gas temperature below a predetermined value to elevate the exhaust gas temperature and reduce the emission of condensed unburned fuel.

The above advantages as well as others will become apparent from the several figures and the following detailed description of the preferred embodiment.

DETAILED DESCRIPTION OF THE PREFERRED EMBODIMENT

Figure 1:
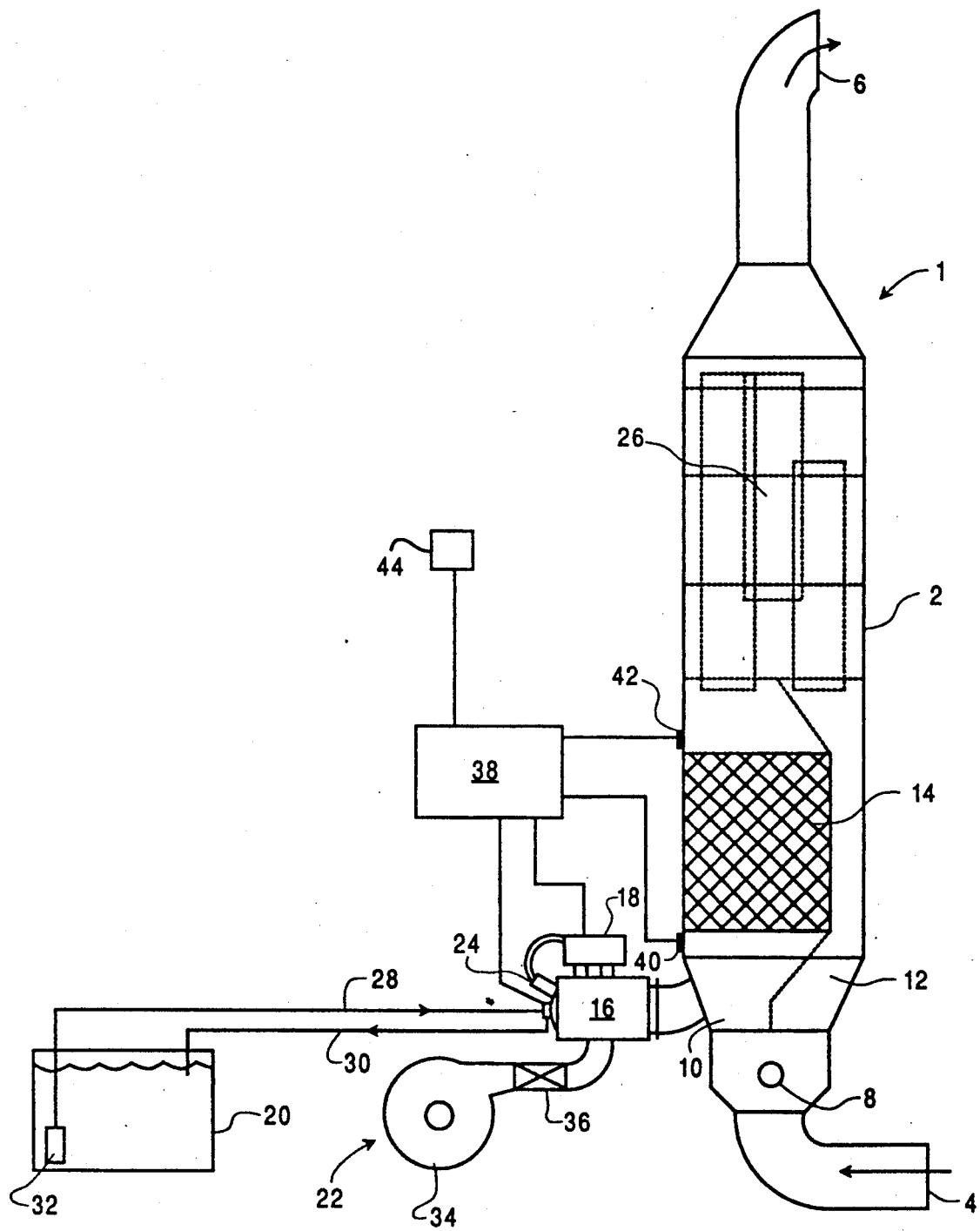
FIG. 1 is a schematic representation of a high efficiency exhaust gas aftertreatment system to which the present invention may be readily adapted.

An integral bypass particulate trap system 1 for reducing particulate emissions from internal combustion engines of the type disclosed in commonly assigned U.S. application Ser. No. 390,884 filed Aug. 8, 1989, and Ser. No. 388,675 filed Aug. 2, 1989, the disclosures of which are incorporated herein by reference, is schematically illustrated in FIG. 1. This integral bypass particulate trap system 1 is of a unitary construction having all of its major components provided within housing 2. By providing such a unitary compact construction, this system may be easily installed within new or existing vehicles and may be readily removed therefrom for repair.

Referring to FIG. 1, the housing 2 includes an inlet 4 and an outlet 6, thus allowing for simple placement within existing exhaust systems. Accommodated within the housing 2 is a diverter valve 8 which allows the exhaust gas emitted from the internal combustion engine (not shown) to flow through either the main flow passage 10 or the by-pass flow passage 12. Within the main flow passage 10 there is positioned a particulate trap 14. The particular design of the particulate trap is not envisioned as part of the present invention and may be of the uncatalyzed wall flow monolith type or of the uncatalyzed ceramic foam type both of which adequately capture the carbonaceous portion of the particulate matter which flows therethrough.

When in the trapping mode, exhaust gas from the internal combustion engine is restricted to flow through the particulate trap 14 located in the main passage 10. In doing so, carbonaceous particulate matter in the engine exhaust is removed by the particulate trap as the exhaust gas passes through the medium of the trap 14 and is then permitted to escape through the outlet 6 to the atmosphere.

Mounted in a position adjacent to the main flow path is a regeneration burner 16 which is periodically activated by a coil 18 for oxidizing the particulate matter trapped in the particulate trap 14. The regeneration burner 16 is a high temperature diesel fuel burner and is located immediately upstream of the particulate trap inlet. The burner 16 may be of the type illustrated in U.S. Pat. No. 4,383,411 discussed above and includes a fuel supply 20, an air supply 22 and igniter 24 which is activated by coil 18. Further, positioned within the by-pass flow passage 12, which is essentially parallel to the main flow passage 10, is an acoustic section 26. When in the regeneration mode, the diverter valve 8 directs the exhaust gas flow through the by-pass flow passage 12 and subsequently through the acoustic section 26 prior to expulsion to the atmosphere through outlet 6.

Fuel is supplied to the burner 16 by way of the supply line 28 with any unused portion of the fuel being returned to fuel supply 20 by way of return line 30. When the regeneration burner 16 is activated, fuel is pumped through the supply line 28 by way of a burner fuel pump 32 located at the fuel supply 20. Additionally, when the regeneration burner 16 is activated, air is required to form a predetermined air/fuel mixture within the regeneration burner 16, and such air is supplied by an air supply system 34 by way of the valve 36.

During normal operation, i.e., when the integral by-pass particulate trap system 1 is in the trapping mode, the burner 16 is deactivated and exhaust gas from the internal combustion engine is restricted to flow through the particulate trap 14 before being expelled to the atmosphere through outlet 6. A control module 38 is provided for monitoring the flow of exhaust gas through the particulate trap during the trapping mode. Upon the sensing of a predetermined condition, the control module 38 will switch the by-pass valve 8 to restrict the flow of exhaust gas through the by-pass flow passage 12 and activate the coil 18 and consequently the igniter 24 to activate the burner 16 as well as the blower 34. As can be seen from the prior art discussed above, there are numerous ways in which an integral by-pass system may determine the capacity of particulate matter trapped within the particulate trap 14 in order to commence regeneration of the particulate trap. These methods may include detecting a pressure drop across the particulate trap, detecting the temperature of the exhaust gas both before entering the particulate trap and at the exit of the particulate trap, or by merely determining a time lapse which has occurred since the previous regeneration cycle. Each of the above mentioned control systems require the use of various sensors positioned within the integral by-pass trap system 1.

It is a modification of the above mentioned control system which constitutes the primary subject of the present invention. Specifically, as shown in FIG. 1, the control module 38 receives continuous data from the temperature sensors 40 and 42 which continuously monitor the temperature of the exhaust gas both entering and exiting the particulate trap 14. Also provided is a ambient air temperature sensor 44 which provides the control module with a value indicative of the air temperature outside the vehicle. An alternative to the use of an ambient air temperature sensor would be an engine coolant temperature sensor that would also be accurate in predicting conditions conducive to white smoke emissions. Each of these values are then compared to predetermined values of both the ambient air temperature and exhaust gas temperature in order to determine whether to activate the burner 16 in order to raise the exhaust gas temperature and consequently reduce or eliminate the white smoke emanating from the outlet 6 of the integral by-pass trap 1.

The particular predetermined value of both the exhaust gas temperature and ambient air temperature will be directly dependent upon the environment in which the vehicle is intended to be operated. In communities where it is difficult to meet the National Ambient Air Quality Standards for hydrocarbons and ozone levels, these values would be higher than in those communities where such environmental restrictions are not as strict. As on will note, the amount of visible white smoke emanating from a diesel powered vehicle is directly dependent upon the exhaust gas temperature and ambient air temperature. Therefore, in areas where it is difficult for vehicles of this type to meet the National Ambient Air Quality Standards for hydrocarbons and ozone levels, the predetermined value of the ambient air temperature would be relatively high, on the order of approximately 60° F. The predetermined value for an engine coolant temperature sensor, if used, would be on the order of 150° F. or less. Similarly, the predetermined exhaust gas temperature may be on the order of 300° F. Again, this value is purely arbitrary and may be readily modified to meet existing conditions. An exhaust temperature less than 300° F. will typically occur only after a cold start prior to loaded operation or after a period of extended idle (>5 minutes), when white smoke emissions are more likely to be present. Therefore, if both the ambient air temperature is less than 60° F. and the exhaust gas temperature is less than 300° F., and the integral by-pass particulate trap system 1 is not already in the regeneration mode, the control module 38 will activate the burner 16 in order to heat the particulate trap to a temperature sufficiently high enough for combustion of the unburned fuel. It should be noted that once the vehicle is driven underload for a sufficient amount of time, the exhaust gas temperature will inherently increase to a point above that which requires the use of an additional heating source and consequently the control module 38 will deactivate burner 16 and terminate the heating of the particulate trap 14.

Figure 2:
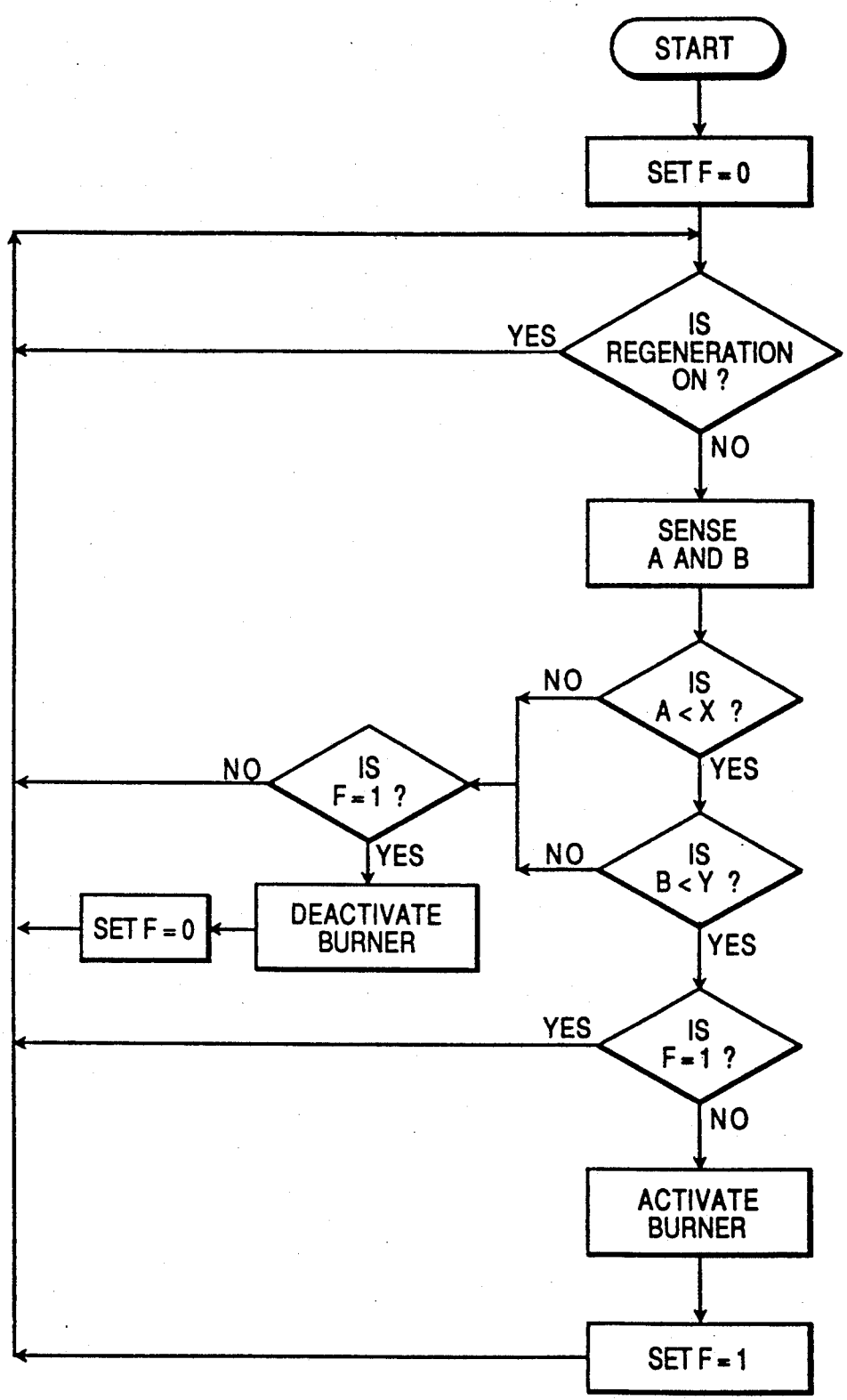
FIG. 2 is a flow chart illustrating an example of the operational program for a microcomputer used in a control unit employed in the system of FIG. 1.
Figure 3:
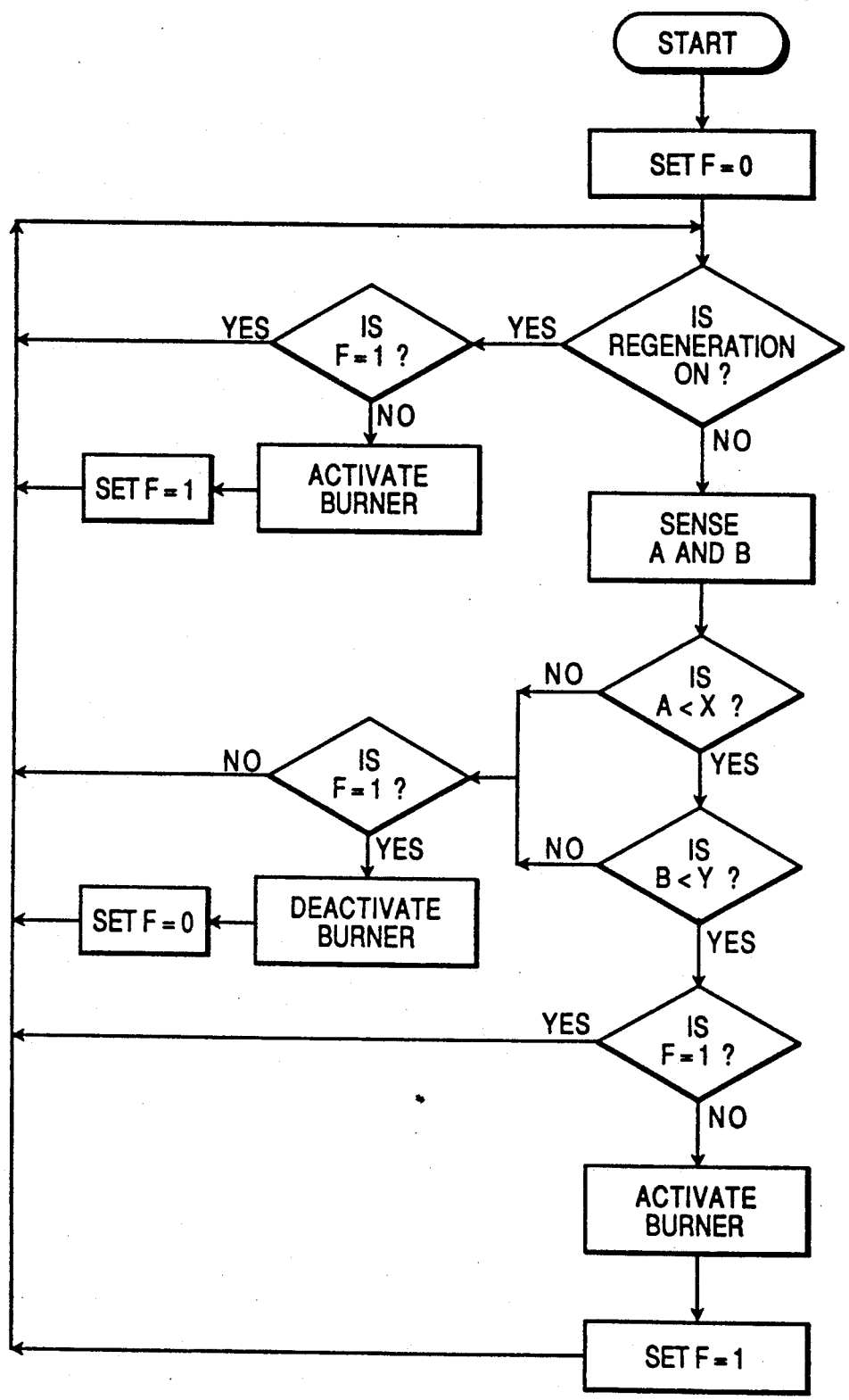
FIG. 3 is a flow chart illustrating an alternative operational program for a microcomputer used in a control unit employed in the system of FIG. 1.

Turning now to FIGS. 2 and 3, the particular evaluation undertaken by the control module 38 will be discussed in greater detail. With reference to FIG. 2, at start-up of the engine, an operation value or control parameter F is initially set to equal 0 which indicates that the burner 16 is in the deactivated condition. Next, the control module 38 determines whether the integral by-pass particulate trap system 1 is in the regeneration mode, i.e., whether the burner 16 is already activated. During initial start-ups, it is very unlikely that the system will be in the regeneration mode and consequently the burner 16 would not be on. Next, the control module 38 receives values indicative of the ambient air temperature A and the exhaust gas temperature B. If the ambient air temperature A is less than a preset predetermined value X, and the exhaust gas temperature B is less than a preset predetermined value Y the control module 38 would then determine if the burner 16 is already on, if the burner is not on, the burner 16 would then be activated and the control parameter F set equal to 1 indicative of the burner 16 being activated. If either the ambient air temperature A is not less than X or the exhaust gas temperature B is not less than Y, the control module would again determine if the burner 16 is in the activated condition. If not, a continuous loop would take place. If the burner 16 is in the activated condition, the control module would deactivate the burner 16 and again reset the control parameter F to 0. This system allows the control module to continuously monitor the ambient air temperature and exhaust gas temperature in order to determine whether to activate or deactivate the burner 16.

Turning now to FIG. 3, an additional step is performed by the control module for assuring that when the integral by-pass system 1 is to be in the regeneration mode that the burner 16 is in fact activated. As previously, during the initial start-up of the engine, the control parameter F is set equal to 0 indicative that the burner 16 is deactivated. The control module 38 then determines whether the integral by-pass system 1 is in the regeneration mode. If so, the control parameter is checked to determine whether the burner 16 is in fact activated. If the burner is activated the control module continues the monitoring loop. If not, the burner 16 is activated and the control parameter F is again set equal to 1. If the control module 38 determines that the integral by-pass particulate trap system 1 is not in the regeneration mode, the control system would then continue in the manner set forth with respect to FIG. 2.

Therefore by modifying the existing control module and providing the additional sensor 44 for sensing the ambient air temperature, an inexpensive and reliable system for eliminating white smoke emissions from diesel engines during cold starts and prolonged idle in cold weather is provided. This will both reduce the hydrocarbon emissions of these diesel engines and eliminate much of the odor associated with the white smoke and consequently will broaden the overall acceptance of diesel powered vehicles.

While the invention has been described with reference to the preferred embodiments, it will be appreciated by those skilled in the art that the invention may be practiced otherwise than as specifically described herein without departing from the spirit and the scope of the invention. It is therefore, to be understood that the spirit and the scope of the invention be limited only by the appended claims.

INDUSTRIAL APPLICABILITY

The above described control system for eliminating white smoke emissions from diesel engines may be incorporated into the control system of both existing and new diesel powered vehicles where it is desired to eliminate white smoke emissions during cold starts and prolonged idling in cold weather. Further, this control system may be incorporated into stationary diesel engines used for generating power and operating various types of machinery wherein irritating white smoke is emitted and National Ambient Air Quality Standards for hydrocarbons and ozone levels must be met.

What is claimed:

1. A method of reducing the emission of condensed unburned fuel from diesel engines including the steps of;
    determining ambient air temperature,
    determining exhaust gas temperature;
    comparing the determined ambient air temperature to a predetermined ambient air temperature;
    comparing the determined exhaust gas temperature to a predetermined exhaust gas temperature; and
    activating a heating means to heat said exhaust gas if said ambient air temperature is less than said predetermined ambient air temperature and said exhaust gas temperature is less than said predetermined exhaust gas temperature.

2. The method as defined in claim 1, wherein said predetermined ambient air temperature is approximately 60° F.

3. The method as defined in claim 1, wherein said predetermined exhaust gas temperature is approximately 300° F.

4. The method as defined in claim 1, further comprising determining whether said heating means is activated before determining said ambient air temperature and said exhaust gas temperature.

5. The method as defined in claim 4, further comprising the step of determining whether said heating means is activated after comparing the determined ambient air temperature to the predetermined ambient air temperature and the determined exhaust gas temperature to the predetermined exhaust gas temperature.

6. The method as defined in claim 1, further comprising the step of determining whether said heating means is activated after comparing the determined ambient air temperature to the predetermined ambient air temperature and the determined exhaust gas temperature to the predetermined exhaust gas temperature.

7. A system for reducing the emission of condensed unburned fuel from diesel engines comprising;
 an exhaust gas flow passage for directing the flow of exhaust gas;
 heating means for heating the exhaust gas;
 sensing means for determining ambient air temperature and exhaust gas temperature; and
 a control means for activating said heating means in response to said sensing means determining an ambient air temperature below a predetermined value and an exhaust gas temperature below a predetermined value to elevate the exhaust gas temperature and reduce the emission of condensed unburned fuel.

8. The system as defined in claim 7, further comprising a trapping means positioned within said exhaust gas flow passage, said trapping means being heated by said heating means.

9. The system as defined in claim 8, wherein said trapping means is a ceramic particulate filter.

10. The system as defined in claim 7, wherein said heating means is a high temperature diesel fueled burner.

11. The system as defined in claim 7, wherein said predetermined ambient air temperature is approximately 60° F.

12. The system as defined in claim 7, wherein said predetermined exhaust gas temperature is approximately 300° F.

* * * * *